Feb. 27, 1934. H. E. KETTLEWELL ET AL 1,949,103
ROLL NECK LUBRICATOR FOR ROLLING MILLS
Filed July 22, 1932 3 Sheets-Sheet 1
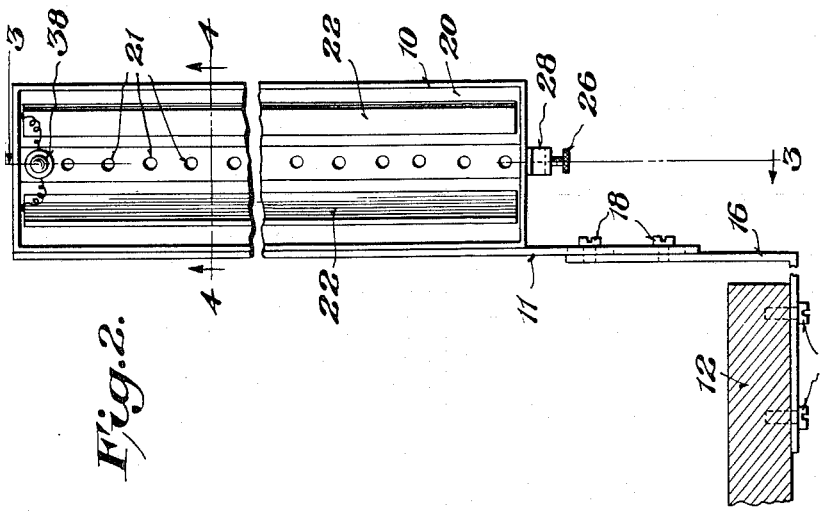
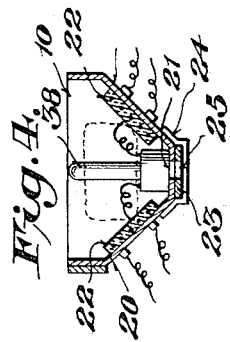
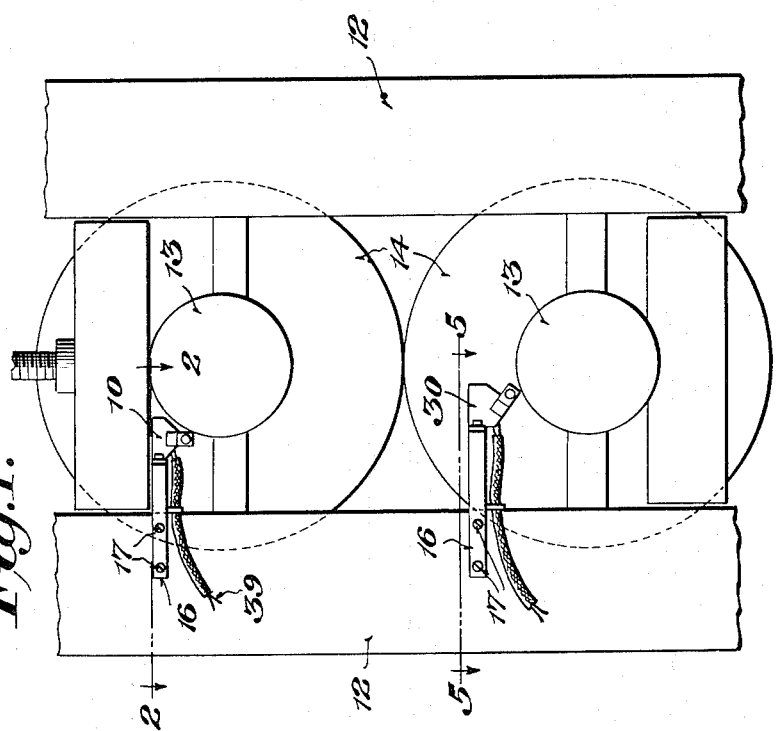
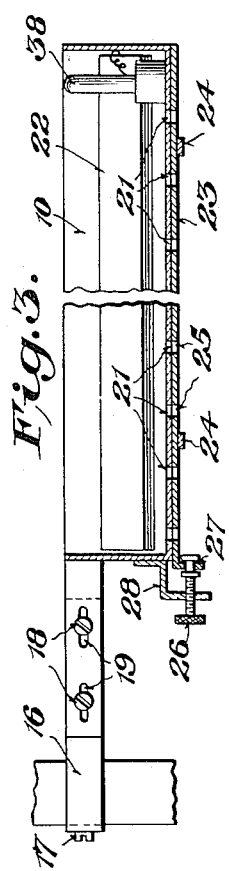
Inventors
*Harry E. Kettlewell,*
*Louis Petitclaire,*
Their Attorneys Feb. 27, 1934.    H. E. KETTLEWELL ET AL    1,949,103
ROLL NECK LUBRICATOR FOR ROLLING MILLS
Filed July 22, 1932    3 Sheets-Sheet 2
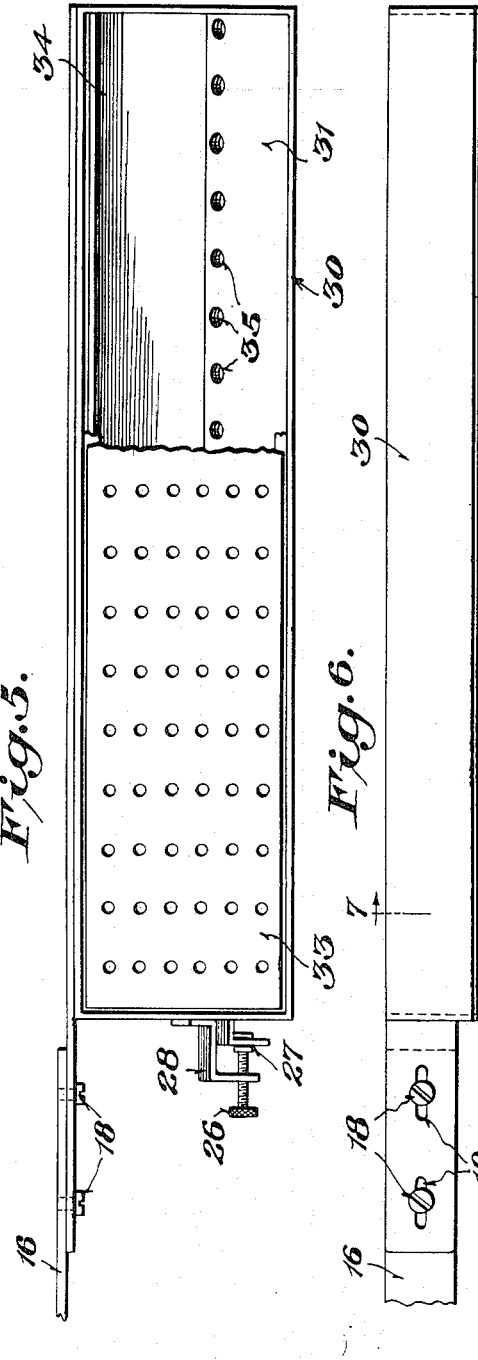
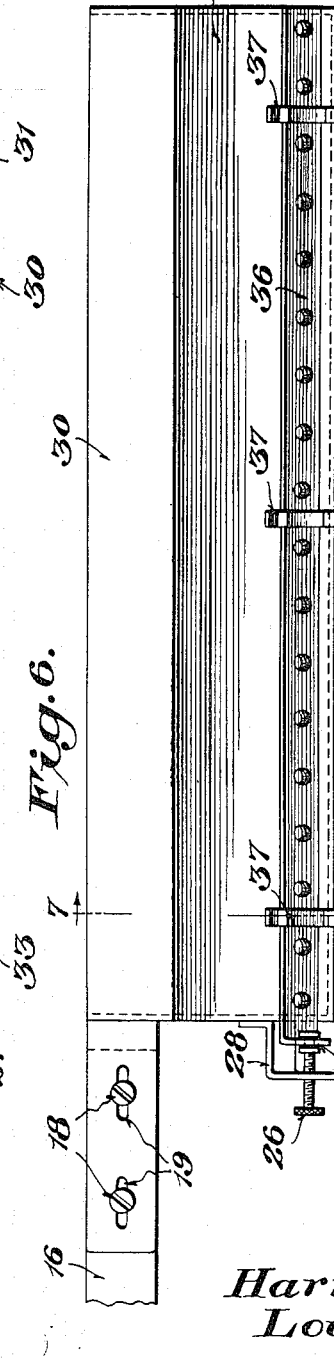
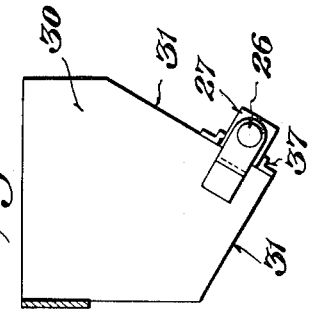
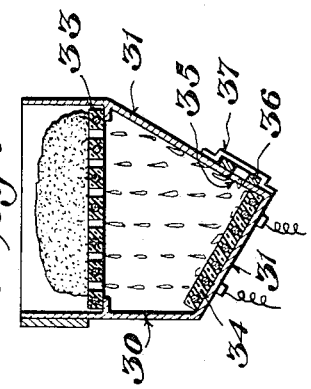
Inventors
Harry E. Kettlewell,
Louis Petitclaire, Feb. 27, 1934.   H. E. KETTLEWELL ET AL   1,949,103
ROLL NECK LUBRICATOR FOR ROLLING MILLS
Filed July 22, 1932   3 Sheets-Sheet 3
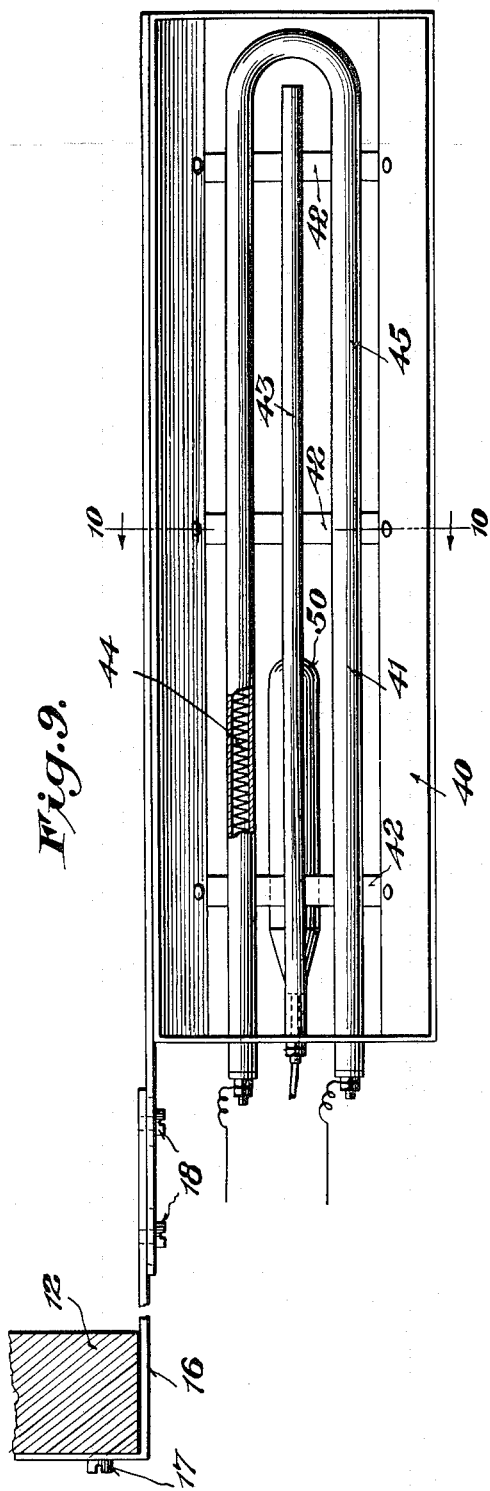
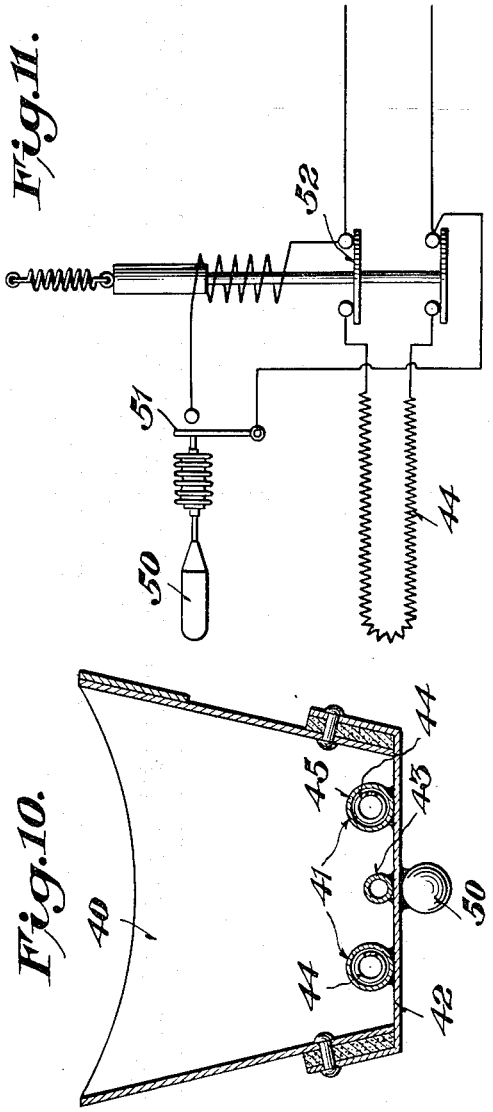
Inventors
Harry E. Kettlewell,
Louis Petitclaire,
their Attorneys Patented Feb. 27, 1934

1,949,103

UNITED STATES PATENT OFFICE

1,949,103

ROLL NECK LUBRICATOR FOR ROLLING MILLS

Harry E. Kettlewell, Poland, and Louis Petitclaire, Struthers, Ohio, assignors to Industrial Grease Company, a corporation of Ohio Application July 22, 1932. Serial No. 624,116

16 Claims. (Cl. 184—14)

The present invention relates to roll neck lubricators for rolling mills and the like and aims generally to improve existing lubricators and methods of lubrication.

More particularly our invention provides a means for adequately and continuously lubricating the necks of rolls of rolling mills and similar equipment, to avoid the customary required swabbing or chunking of the roll necks with grease. Various other uses of the invention may be made, for example, in lubricating up-turning and down-turning gears and pinions, or as a means of coating or lubricating strands of wire, rope or cable by placing the lubricator over sheaves, drums, and the cable or rope itself.

The nature and specific advantages of our invention will more fully appear by reference to the following description and the accompanying drawings which are illustrative of preferred embodiments of our invention and wherein Fig. 1 is an end elevation of a portion of a rolling mill illustrating our improved lubricators in place;

Fig. 2 is a plan view of one of the lubricators, the view being taken on the line 2—2 of Fig. 1;

Fig. 3 is a vertical sectional view thereof taken on the line 3—3 of Fig. 2;

Fig. 4 is a transverse sectional view taken on the line 4—4 of Fig. 2;

Fig. 5 is a plan view of a modified form of lubricator;

Fig. 6 is a side elevation thereof;

Fig. 7 is a transverse sectional view taken on the line 7—7 of Fig. 6;

Fig. 8 is an end elevation thereof.

Fig. 9 is a plan view of another embodiment of the invention;

Fig. 10 is a transverse sectional view taken on the line 10—10 of Fig. 9; and

Fig. 11 is a diagrammatic view showing a preferred manner of controlling the heating elements.

In the accompanying illustrative drawings our invention is shown applied to rolling mill housing for the purpose of lubricating the roll necks with grease, and although the invention is primarily intended for the lubrication of such roll necks, whether for sheet, tin, bar or plate mills for either hot or cold rolling, it is to be understood that it is applicable and intended to apply to other installations requiring similar lubrications.

According to the illustrative embodiment (shown in Figs. 1 to 4) the lubricator comprises a container 10 for holding and heating the grease which is usually in the form of a block, which container is carried by a bracket or support 11 adjustably supported on the mill housing 12 so as to extend inwardly between the spaced uprights of the housing 12 and lie closely adjacent the roll necks 13 of the rolls 14 throughout substantially their entire length, i. e. from the fillet of the roll neck to the ends thereof.

Advantageously the container 10 is supported in desired position by means of an angle bracket 16 adapted to be bolted or otherwise secured as at 17 to the end of the mill housing 12, one arm of the angle bracket extending inwardly between the end uprights of the housing 12 as shown in Fig. 2. The inner end of this arm is apertured to receive bolts or other fastening 18 extending through longitudinal slots 19 of the bracket or support 11 whereby the bracket 11 and the container carried thereby are adjustably mounted with reference to the adjacent roll neck, and may be adjusted toward and from the fillet of the roll 14.

The container 10 for the grease is advantageously of desired length to extend the entire length of the roll neck, that is, from the fillet 15 to the end of the roll, and is securely fastened to the support 11 in any suitable manner as by welding to provide a strong unitary structure.

According to one embodiment of our invention the container 10 may be trough-shaped, as shown in Fig. 4, and accordingly formed with downwardly and inwardly sloping sides 20 presenting a trough-shaped bottom, the central portion of which may be apertured as at 21 for the discharge of melted grease on the adjacent roll neck. As the grease used in such mills is usually supplied in cakes or bars, it is necessary to heat or melt it to a fluid or semi-fluid condition so that it will flow by gravity upon the adjacent roll neck and accordingly lubricate the neck of the roll. Mounted within the container 10 are heating elements 22 preferably electrical heating units, for supporting and heating the grease cake or bar, so that as melted, the grease will flow down to the trough-shaped bottom for discharge upon the roll necks.

The flow or discharge of the melted or liquid grease upon the roll necks may be adjustably varied and controlled to suit the particular type of roll neck to be lubricated as well as for the nature of the work being performed, and may be effected by any suitable means adaptable for the purpose. One type of regulator suitable for our invention comprises a slide or valve bar 23 slidably supported against the bottom of the container, as by straps or other supporting guides 24, the bar being provided with a series of perforations 25 corresponding in number and spacing to the aperture 21 in the trough bottom of the container so that when the apertures 21 and perforations 25 are in alignment the liquid grease may flow freely upon the roll neck. In order to variably control or diminish the discharge of grease from the container, means are provided for adjusting the valve or slide bar 23 to adjustably vary and control the alignment of the discharge apertures 21 and 25. In its simplest form, such adjustment may be effected by means of a hand wheel 26 swivelly connected as at 27 to the bar 23 and threadedly engaging a bracket or support 28 fastened to the outer end of the container 10.

In certain installations it is difficult or impossible to use a lubricator, which discharges the grease from the bottom side thereof and where it is necessary to mount the lubricator at one side of the part to be lubricated. In such cases we prefer to use a lubricator of the type shown in Figs. 5 to 8 wherein the container 30 has converging bottom side walls 31 with vertically spaced electrical heating units 33 and 34. The heating unit 33 provides a reticulated support for supporting and heating the grease cake, permitting the semi-liquid grease to drop to one inclined bottom where it is additionally heated and melted by the electrical heating unit 34. In such case the discharge openings 35 in the container may be in one side wall adjacent the bottom, so as to discharge grease laterally from the side of the container as shown, in which case the valve bar 36 and supporting guides 37 are positioned at one side of the vertical axis of the container. Such an arrangement with a side outlet discharge is particularly advantageous where, because of the construction of the machine to which the lubricator is applied, it is impossible to mount it directly above the part to be lubricated. In addition to the variable control provided by the adjustable valve bar 23 or 37, the supply of grease may be regulated by variably controlling the heating units as by means of an adjustable thermostat 38 in the circuit 39 of the heating units.

According to another preferred embodiment of the invention the lubricator may include an open bottom container 40 having downwardly converging side walls (see Figs 9 to 11) within the open bottom of which are located heating elements 41 supported by and secured to brackets 42 extending across the open bottom of the container and secured to the sides thereof. Thus the open bottom of the container constitutes an outlet for the melted grease which may be restricted or divided, according to the specific purpose of the lubricator, as by a strip of metal 43, such as copper, welded or otherwise secured to the brackets.

The heater elements may advantageously be in the form of coils 44 housed within one or more tubes 45, the tubes being advantageously supported in position by the brackets 42 so as to position the heaters within the outlet or throat of the container 40.

In the form of invention shown in Figs. 9 to 11, the flow of grease onto the roll neck may advantageously be controlled by regulating the heat in the heating elements and thus regulating the rate of melting of the grease block. For this purpose we contemplate regulating the current to the heating elements by a rheostat (not shown) or by means of a thermostat bulb 50 positioned adjacent the heating elements and operatively connected to a thermostat switch 51 connected to a suitable contactor switch, such as a double throw-magnetic relay 52, or equivalent device for interrupting the circuit to the coils 44 on operation of the thermostatic switch 51.

Advantages of our invention consist in the provision of means for properly lubricating roll necks of rolling mills and the like which heretofore have been largely, if not entirely, lubricated manually by swabbing the part to be lubricated with a grease swab or by manually placing blocks of grease directly on the roll necks. By continuously heating and controlling the flow of grease to the roll necks, the proper amount of grease required may be accurately controlled, with the result that no old or pit grease will remain, thus avoiding the necessity of reclaiming such used grease for further use. It is thus possible, with considerable saving in the cost of grease, to insure an adequate supply of new grease free from carbon and scale, which will result in a considerable saving in brass cost and other troubles commonly experienced in the operation of rolling mill equipment.

In the foregoing specification and in the accompanying claims we have referred generally to our invention as applied for lubricating the roll necks of rolling mills. It is to be understood that this reference is general and not intended to restrict the scope or application of our invention as obviously the invention is applicable to the moving parts of other types of machines requiring similar kinds of lubrication.

Having described the nature and explained the manner of using our invention, what we claim as new is—

1. A lubricator for roll necks of rolling mills and the like comprising a container, an outlet for said container extending throughout the length thereof, electrical heating means within said container for supporting and melting a cake of grease, and means for supporting the container in operative relation to the necks of the rolls to be lubricated.

2. A lubricator for roll necks of rolling mills and the like comprising an elongated container having a converging trough shaped bottom, an outlet for the container extending throughout the length thereof, electrical heating means within said container for supporting and melting a cake of grease, and means for supporting the container in operative relation to the necks of the rolls to be lubricated.

3. A lubricator for roll necks of rolling mills and the like comprising a container, an outlet for said container extending throughout the length thereof, electrical heating means within said container for supporting and melting a cake of grease, means for adjusting and variably controlling the discharge of melted grease throughout said outlet, and means for supporting the container in operation relative to the necks of the rolls to be lubricated.

4. A lubricator for roll necks of rolling mills and the like, comprising a container, an outlet for said container extending throughout the length thereof, electrical heating means within said container for supporting and melting a cake of grease, means for supporting the container in operative relation to the necks of the rolls to be lubricated, and means for adjustably mounting the container longitudinally of the roll neck to be lubricated.

5. A lubricator for roll necks of rolling mills and the like comprising an elongated container having a converging trough-shaped bottom, outlet means for the container extending throughout the length thereof, electrical heating means mounted within said containers and adjacent the bottoms thereof for supporting and melting a cake of grease, and means for supporting the container in operative relation to the necks of the rolls to be lubricated.

6. A lubricator for roll necks of rolling mills and the like comprising a container for a supply of grease, electrical means within the container for supporting and melting said grease to liquid form, means for regulating the flow of melted grease continuously from said containers, and means for supporting said container in operative relation to the roll necks so that the grease may flow continuously from said container directly upon the roll necks to be lubricated.

7. A lubricator for roll necks of rolling mills and the like comprising a container for a supply of cake grease, said container having a trough-shaped bottom presenting a discharge area substantially throughout the length thereof, electrical heating means within said container adjacent said discharge area for heating and melting the grease substantially at the discharge area of the container, and means for regulating the flow of grease from the container.

8. A lubricator for roll necks of rolling mills and the like comprising a container for a supply of grease, said container having a trough-shaped bottom presenting a discharge area substantially through the length thereof, electrical heating means within said container adjacent said discharge area for supporting and melting the grease substantially at the discharge area of the container, and means for regulating the flow of grease from the container.

9. A lubricator of the type described comprising in combination an elongated casing for containing a supply of grease, electrical means within said casing for supporting and melting said grease to liquid form, the bottom walls of said casing presenting a trough-shaped bottom providing a discharge area substantially throughout the length thereof, and means for regulating the gravity flow of grease through said discharge area.

10. A lubricator of the type described comprising in combination an elongated casing for containing a supply of grease, electrical means within said casing providing a reticulated support and heater for supporting and melting said grease to liquid form, the bottom walls of said casing presenting a trough-shaped bottom providing a discharge area substantially throughout the length thereof, and means for regulating the gravity flow of grease through said discharge area.

11. A lubricator of the type described comprising in combination an elongated casing for containing a supply of grease, electrical means within said casing providing a reticulated support and heater for supporting and melting said grease to liquid form, the bottom walls of said casing presenting a trough-shaped bottom providing a discharge area substantially throughout the length thereof, additional heating means for maintaining the grease in the region of said discharge area in liquid form, and means for regulating the gravity flow of grease through said discharge area.

12. A roll neck lubricator for rolling mills for lubricating the necks of the rolls mounted between spaced upright standards of a roll stand housing comprising a container for block grease, heating means within the container for supporting and melting the grease to liquid form, a discharge outlet for the melted grease, and means carried by the roll stand housing for supporting the container adjacent the roll necks between the upright standards.

13. A roll neck lubricator for rolling mills for lubricating the necks of the rolls mounted between spaced upright standards of a roll stand housing comprising a container for block grease, heating means within the container for supporting and melting the grease to liquid form, a discharge outlet for the melted grease, means carried by the roll stand housing for supporting the container adjacent the roll necks between the upright standards and means for adjusting said supporting means whereby the position of container may be adjusted longitudinally of the roll.

14. A lubricator for roll necks of rolling mills and the like comprising a container for a block of grease, electrical heating coils positioned within the container adjacent the outlet thereof for supporting and heating said grease, and means for variably controlling the melting of the grease block by varying the current to said heating coils.

15. A lubricator for roll necks of rolling mills and the like comprising a container for a block of grease, electrical heating coils positioned within the container adjacent the outlet thereof for supporting and heating said grease, and thermostatically controlled means for regulating the heating of said heating coils.

16. A lubricator for roll necks of rolling mills and the like comprising a container for a block of grease, electrical heating coils positioned within the container adjacent the outlet thereof for supporting and heating said grease, means for supplying electrical current to said heating coils and thermostatically controlled means for interrupting said circuit to prevent too rapid melting of said grease.

HARRY E. KETTLEWELL.
LOUIS PETITCLAIRE.